(12) United States Patent
Chen et al.

(10) Patent No.: US 8,540,327 B2
(45) Date of Patent: Sep. 24, 2013

(54) MOUNTING APPARATUS FOR SIDE PANEL OF COMPUTER

(75) Inventors: Yun-Lung Chen, New Taipei (TW); Liang-Chin Wang, New Taipei (TW); Gang Su, Wuhan (CN); Ling-Xin Zeng, Wuhan (CN); Hai-Tao Shan, Wuhan (CN); Zhong-Jie Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/426,621

(22) Filed: Mar. 22, 2012

(65) Prior Publication Data
US 2013/0026893 A1 Jan. 31, 2013

(30) Foreign Application Priority Data
Jul. 25, 2011 (CN) .......................... 2011 1 0208604

(51) Int. Cl.
*H05K 5/00* (2006.01)
(52) U.S. Cl.
USPC ................. 312/223.2; 312/265.6; 361/679.58
(58) Field of Classification Search
USPC 312/223.1, 223.2, 265.5, 265.6; 361/679.57, 361/679.58, 679.59, 679.6; 292/134, 138, 292/145, 163, 164, 175, DIG. 11
See application file for complete search history.

(56) References Cited

U.S. PATENT DOCUMENTS

| | | | | |
|---|---|---|---|---|
| 6,373,692 B1 * | 4/2002 | Cheng | ...................... | 361/679.59 |
| 6,398,325 B1 * | 6/2002 | Chen et al. | .................. | 312/223.2 |
| 6,631,931 B2 * | 10/2003 | Magnusson | .................... | 292/175 |
| 6,904,606 B2 * | 6/2005 | Inoue et al. | ................... | 720/646 |
| 7,193,855 B2 * | 3/2007 | Fan et al. | ....................... | 361/724 |
| 7,252,351 B2 * | 8/2007 | Chen et al. | ................. | 312/223.2 |
| 7,261,383 B2 * | 8/2007 | Fan et al. | ................... | 312/223.2 |
| 2005/0013105 A1 * | 1/2005 | Lin et al. | ........................ | 361/683 |
| 2005/0017608 A1 * | 1/2005 | Lin et al. | .................... | 312/223.2 |
| 2006/0197417 A1 * | 9/2006 | Chen et al. | ................. | 312/223.2 |
| 2013/0140969 A1 * | 6/2013 | Chen et al. | ................. | 312/223.2 |

* cited by examiner

*Primary Examiner* — Janet M Wilkens
*Assistant Examiner* — Daniel Rohrhoff
(74) *Attorney, Agent, or Firm* — Altis Law Group, Inc.

(57) ABSTRACT

An enclosure includes a chassis, a side panel and a knob structure. The chassis includes a rear panel in which a latching hole is defined. The knob structure includes a mounting member, a sliding member engaged in the mounting member, a positioning member secured to the side panel and a resilient member elastically engaged between the sliding member and the positioning portion. The mounting member is secured to the side panel. The sliding member includes a hook. The sliding member can slide from a first position to a second position; when the sliding member is in the first position, the hook engages in the latching hole, when the sliding member is in the second position, the hook disengages from the latching hole; the resilient member elastically deforms to bias the sliding member to slide from the first position to the second position.

12 Claims, 7 Drawing Sheets

MOUNTING APPARATUS FOR SIDE PANEL OF COMPUTER

BACKGROUND

1. Technical Field

The present disclosure relates to mounting apparatuses, and particularly to a mounting apparatus configured to secure a side panel to a computer enclosure.

2. Description of Related Art

There are many different methods to secure side panels to computer enclosures. One method is to screw a side panel directly to a computer enclosure. A tool such as a screwdriver is used to fasten or unfasten the screws when mounting or removing the data storage devices. Such operations are laborious and time-consuming.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
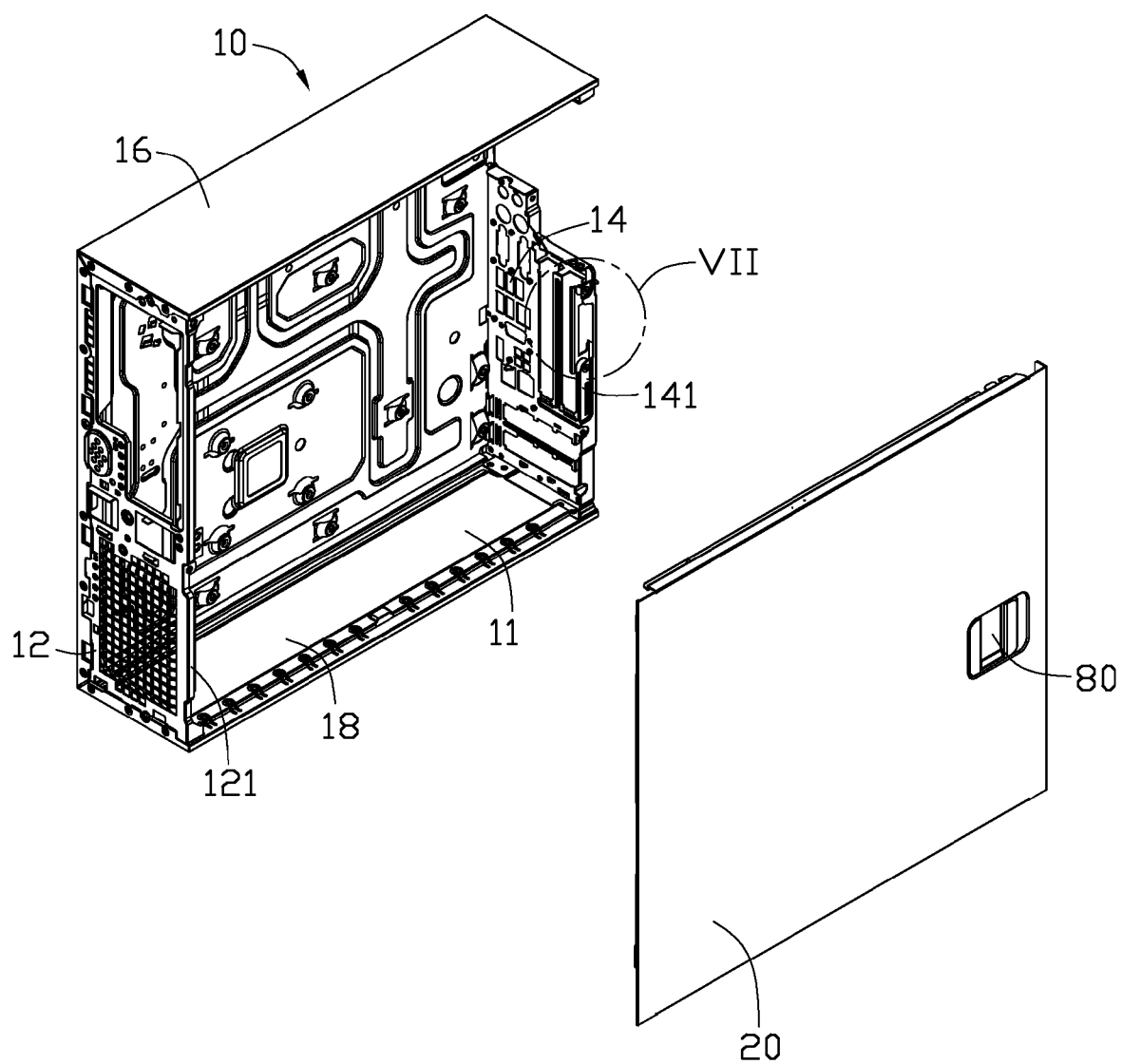
FIG. 1 is an exploded, isometric view of an embodiment of a chassis and a side panel.
Figure 2:
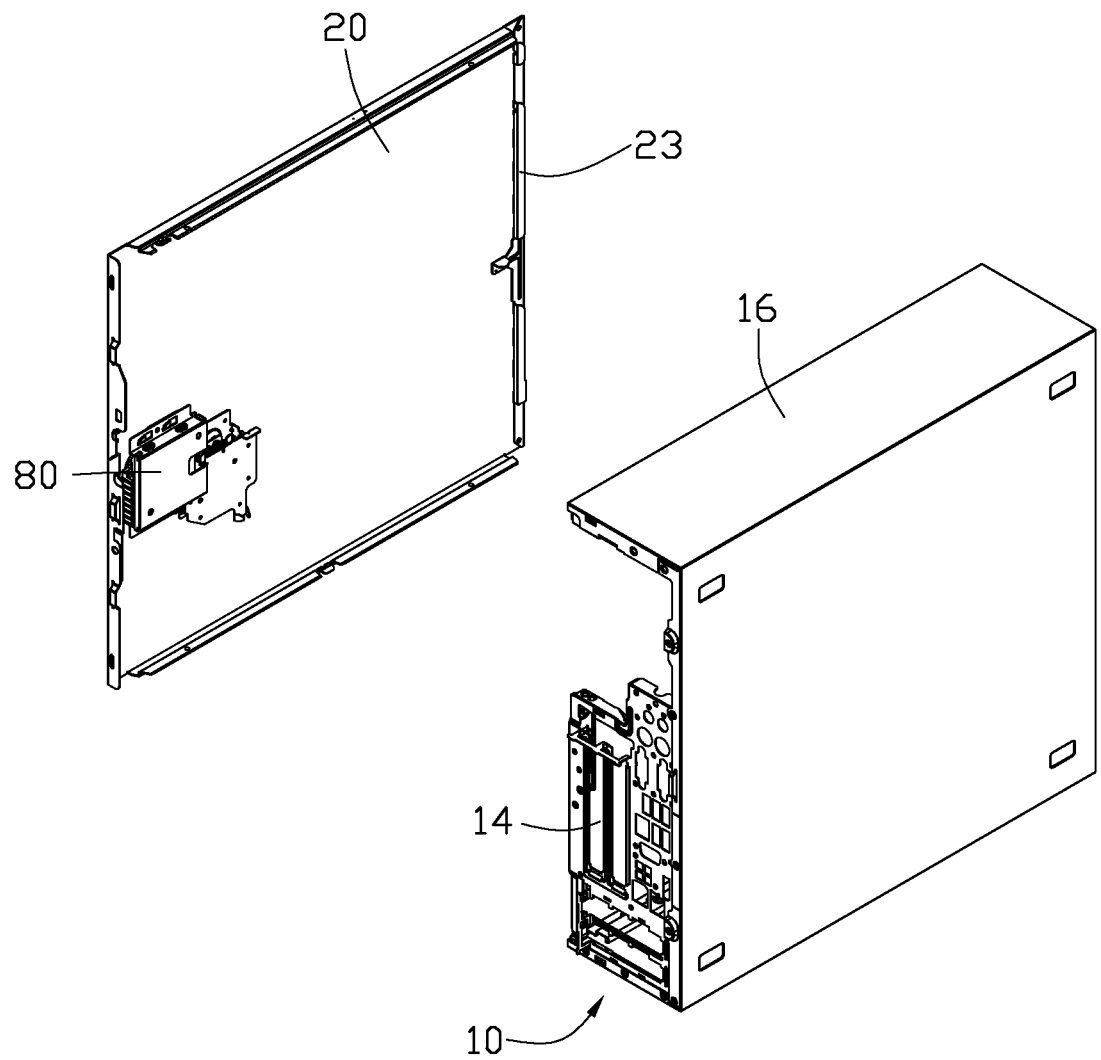
FIG. 2 is similar to FIG. 1, but viewed in different aspect.

Referring to FIG. 1, an enclosure comprises a chassis 10 with an opening 11, a side panel 20 for covering the opening 11, and a knob structure 80 attached to the side panel 20.

Figure 7:
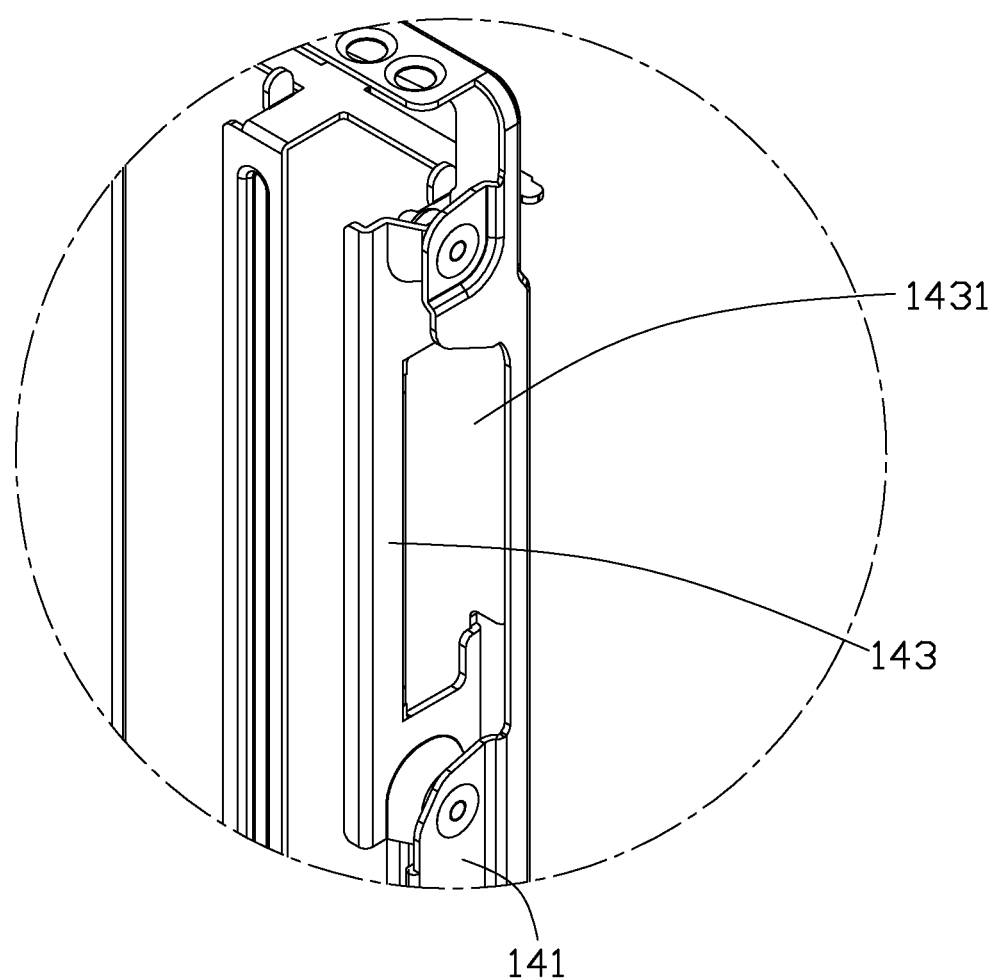
FIG. 7 is an enlarged view of the circled portion VII of FIG. 1.

The chassis 10 comprises a front panel 12, a rear panel 14, a top panel 16 and a bottom panel 18. The front panel 12, the rear panel 14, a top panel 16 and a bottom panel 18 corporately define the opening 11. A hem 121 extends inward from an edge of the front panel 12 in the opening 11. A rim 141 extends inward from an edge of the rear panel 14 in the opening 11. A latching portion 143 (shown in FIG. 7) is located on the rim 141. A latching hole 1431 (shown in FIG. 7) is defined in the latching portion 143. In one embodiment, the latching portion 143 is substantially parallel to the rim 141.

Figure 3:
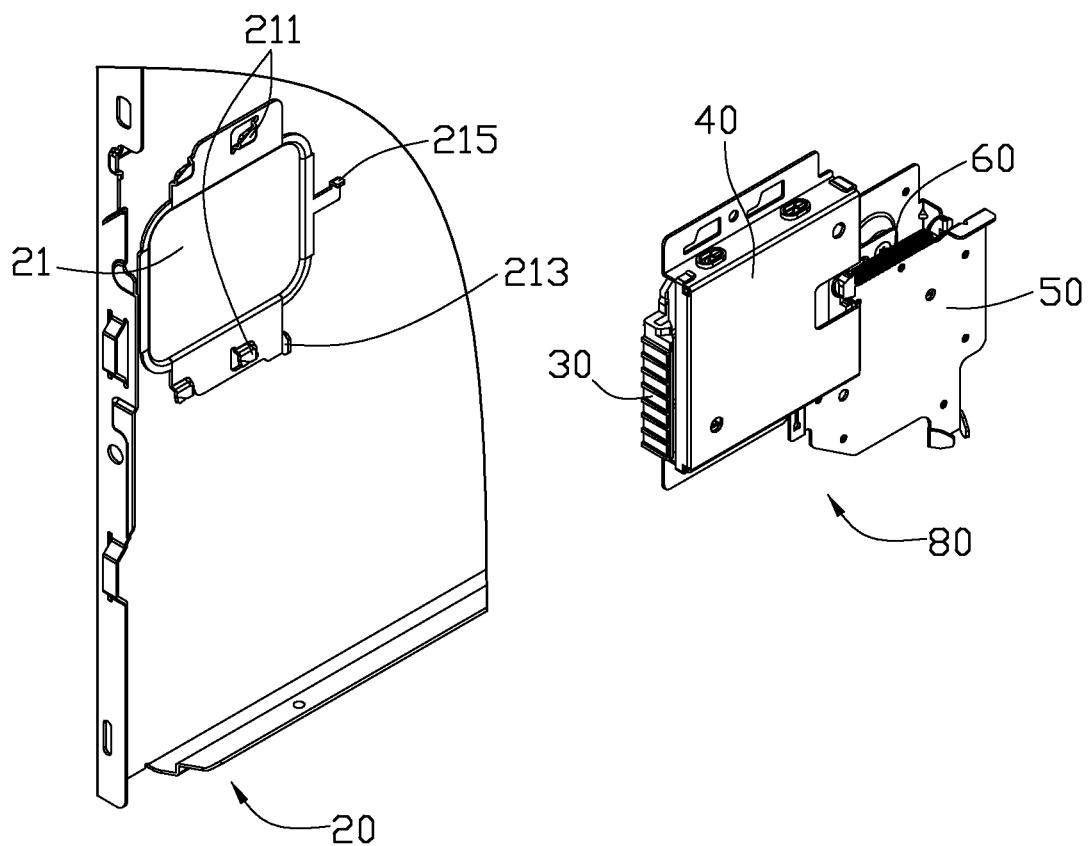
FIG. 3 is a cutaway, exploded view of a side panel and a knob structure.

Referring to FIG. 3, an installation hole 21 is defined in the side panel 20. A clamping piece 23 is located on the side panel 20 and far away from the installation hole 21. Four engaging portions 211 protrude from the side panel 20. The four engaging portions 211 are arranged at two opposite sides of the installation hole 21. In one embodiment, two of the four engaging portions 211 and other two of the four engaging portions 211 are mirror images. A first blocking piece 213 and a second blocking piece 215 protrude from the side panel 20. The first blocking piece 213 is below the installation hole 21 and adjacent to one of the four engaging portions 211. The second blocking piece 215 is arranged at the back side of the installation hole 21.

Figure 4:
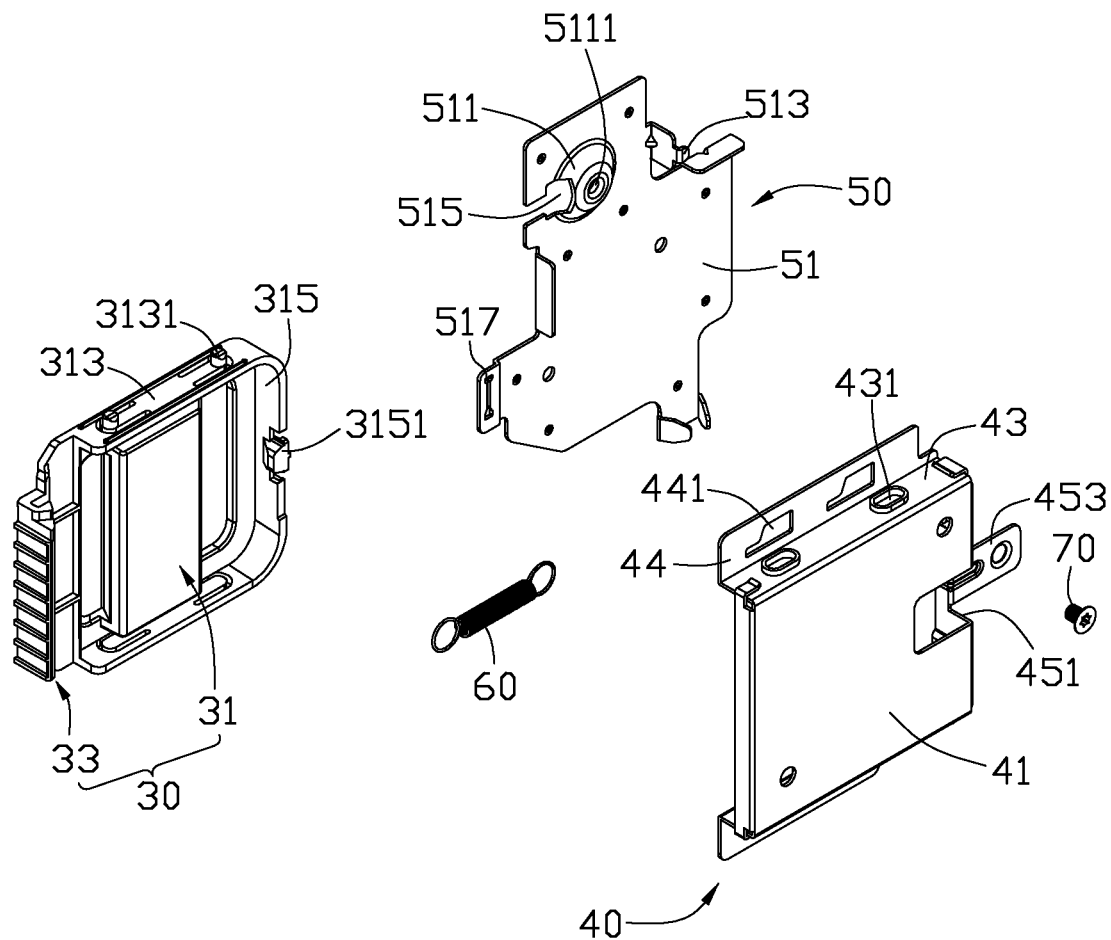
FIG. 4 is an isometric, exploded view of the knob structure of FIG. 3.
Figure 5:
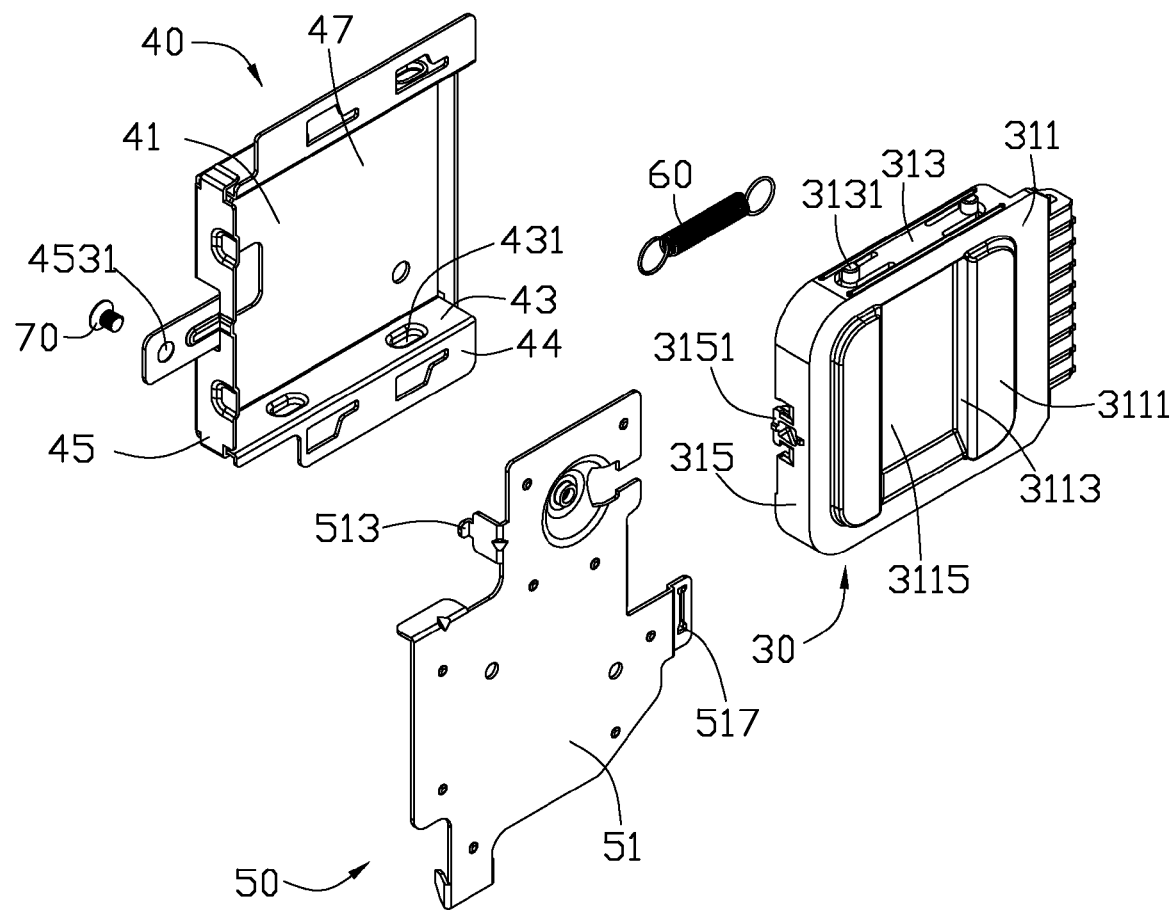
FIG. 5 is similar to FIG. 4, but viewed in different aspect.

Referring to FIGS. 4-5, the knob structure 80 comprises a sliding member 30, a mounting member 40, a positioning member 50, and a resilient member 60.

The sliding member 30 comprises a sliding portion 31, and a hook 33 connected to the sliding portion 31. The sliding portion 31 comprises a sliding board 311, two first sidewalls 313, and a first rear wall 315. Two flanges 3111 protrude from the sliding board 311. Two bent portions 3113 extend inward from the two flanges 3111. The two bent portions 3113 are inclined towards the hook 33. A connecting portion 3115 is connected to the two bent portions 3113. The two flanges 3111, the two bent portions 3113 and the connecting portion 3115 corporately define an operating space (not labeled). The two first side walls 313 extend from two opposite side of the sliding board 311. The first rear wall 315 extends from the back side of the sliding board 311 and is connected to the two first sidewalls 313. Two pillars 3131 extend outward from each of the two first sidewalls 313. A stopping portion 3151 is positioned in the first rear wall 315.

The mounting member 40 comprises a top wall 41, two second sidewalls 43 and a second rear wall 45. Each of the two second sidewalls 43 extends from an opposite side of the top wall 41. Each of the two second sidewalls 43 defines two sliding holes 431. The top wall 41, the two second sidewalls 43 and the second rear wall 45 corporately define a receiving space 47 for receiving the sliding member 30. The mounting member 40 further comprises two securing pieces 44. Each of the two securing pieces 44 extends from each of the two second sidewalls 43. In one embodiment, each of the two securing pieces 44 is substantially perpendicular to each of the two second sidewalls 43 and parallel to the top wall 41. Each of the two securing pieces 44 defines two securing holes 441. The second rear wall 45 extends from back side of the top wall 41 and is connected to the two second sidewalls 43. A gap 451 is defined in the second rear wall 45 extending to the top wall 41. A connecting piece 453 extends from an edge of the gap 451. In one embodiment, the connecting piece 453 is substantially perpendicular to the second rear wall 45 and substantially parallel to the top wall 41. A connecting hole 4531 is defined in the distal end of the connecting piece 453.

The positioning member 50 comprises a positioning board 51. A protrusion 511 extends from the positioning board 51. A screw hole 5111 is defined in the protrusion 511. A limiting portion 513 is located on the positioning board 51 near to one side of the protrusion 511. A cutout 515 is defined in the positioning board 51 near to another side of the protrusion 511. A limiting hole 517 is defined in the positioning board 51 below a left corner of the protrusion 511.

Referring to FIG. 3, in assembly, the two pillars 3131 of the sliding member are engaged in the two sliding holes 431 of the mounting member 40. The stopping portion 3151 is placed in the gap 451 of the mounting member 40. The sliding member 30 is received in the receiving space 47. The hook 33 is located in front of the mounting member 40. The connecting hole 4531 of the connecting piece 453 is aligned with the screw hole 5111 of the positioning member 50. A fastener 70 extends through the connecting hole 4531 and the screw hole 5111 to secure the positioning member 50 to the mounting member 40. A first end of the resilient member 60 extends through the gap 451 to engage with the stopping portion 3151, and a second end of the resilient member 60 is engaged with the limiting portion 513. The knob structure 80 is thereby secured to the side panel 20.

Figure 6:
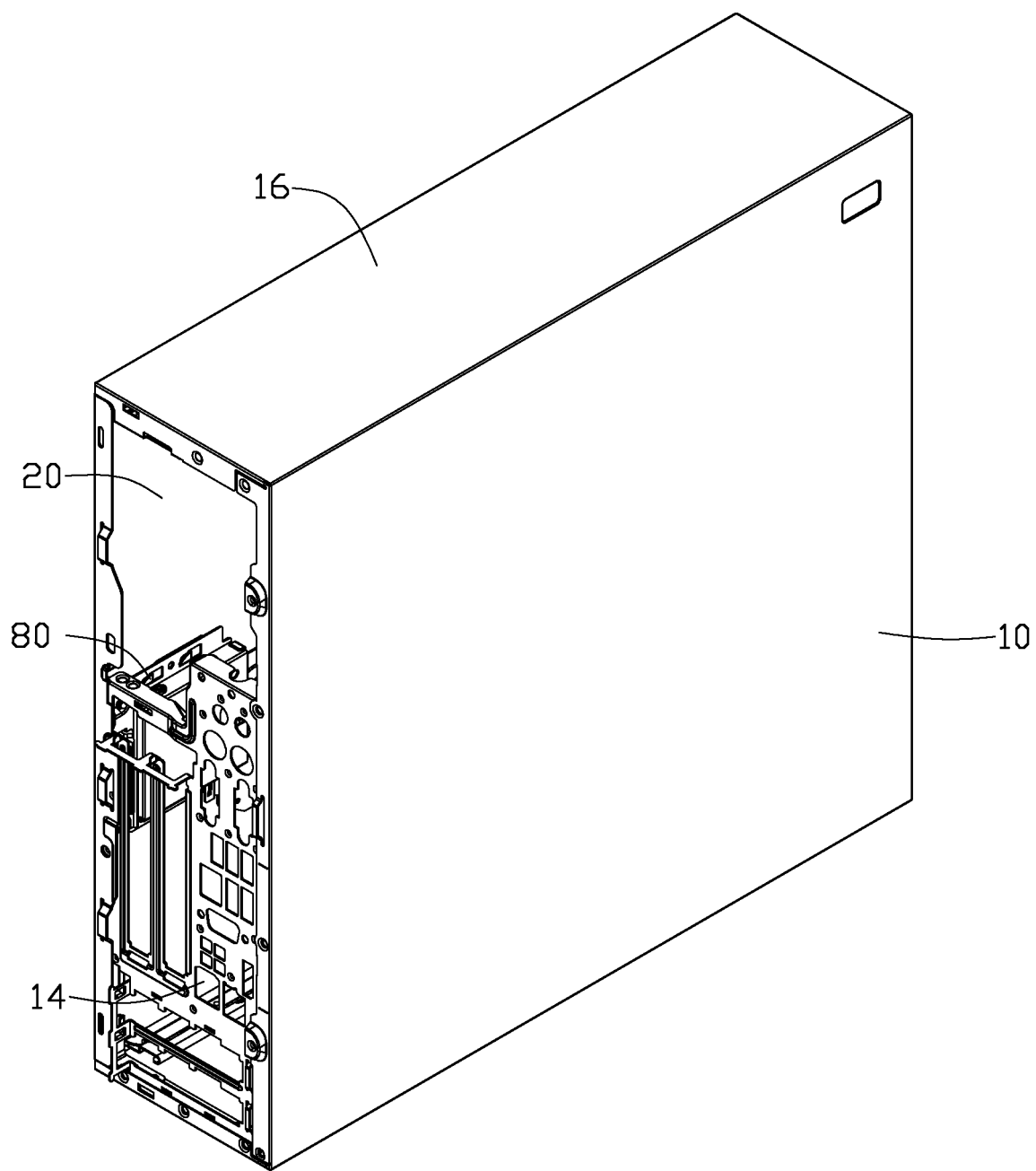
FIG. 6 is an assembled view of the chassis and the side panel of FIG. 1.

Referring to FIG. 6, in assembly of the knob structure 80 to the side panel 20, the knob structure 80 is placed inside of the side panel 20. The two flanges 3111 are slidably received in the installation hole 21. The sliding board 311 and the positioning board 51 separately abut the inside of the side panel 20. The first blocking piece 213 is engaged in the limiting hole 517, and the second blocking piece 215 is engaged in the cutout 515. Each of the four engaging portions 211 is engaged in each of the two securing holes 441. The knob structure 80 is thereby installed on the side panel 20.

In assembly of the side panel 20 to the chassis 10, the bent portion 3113 near to the hook 33 is biased to slide the sliding member 30 along a first direction, and the resilient member 60 is elastically deformed. The clamping piece 23 engages with the hem 121 of the front panel 12. The knob structure 80 is near to the rear panel 14, and the hook 33 extends through the latching hole 1431. The bent portion 3113 is released, and the resilient member 60 elastically returns to bias the sliding member 30 to slide along a second direction opposite to the first direction. The sliding member 30 is then in a first position, the hook 33 is engaged with the latching portion 143. The side panel 20 is thereby installed in the chassis 10.

In disassembly, the bent portion 3113 is biased to slide the sliding member 30 in the first direction. The sliding member 30 is then in a second position, the hook 33 disengages from the latching portion 143, and the side panel 20 is moved away from the chassis 10. The side panel 20 is easily detachable from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An enclosure comprising:
   a chassis defines an opening, the chassis comprising a rear panel, a latching portion located on the rear panel;
   a side panel configured for covering the opening of the chassis; and
   a knob structure for securing the side panel to the chassis, the knob structure comprising a sliding member, a mounting member, a positioning member and a resilient member; the mounting member secured to the side panel and defining at least one sliding hole, the sliding member comprising a hook and at least one pillar, the at least one pillar being slidably engaged in the at least one sliding hole, to secure the sliding member to the mounting member, the positioning member attached to the side panel, and the resilient member elastically engaged between the sliding member and the positioning member; and
   wherein the sliding member is slidable from a first position to a second position; when the sliding member is in the first position, the hook is engaged with the latching portion; when the sliding member is in the second position, the hook is disengaged from the latching portion; and the resilient member is elastically deformable to bias the sliding member to slide from the second position to the first position;
   the sliding member further comprises a stopping portion, the positioning member comprises a limiting portion; a first end of the resilient member is engaged with the stopping portion, and a second end of the resilient member is engaged with the limiting portion;
   the mounting member comprises a second rear wall, a gap is defined in the second rear wall, the first end of the resilient member extends through the gap to engage with the stopping portion; and
   a connecting piece extends from one edge of the gap and is substantially perpendicular to the second rear wall, the positioning member comprises a positioning board, a protrusion extends from the positioning board, and the connecting piece is installed on the protrusion.

2. The enclosure of claim 1, wherein the side panel defines an installation hole, the sliding member further comprises a sliding board abutting an inside surface of the side panel and connected with the hook, two flanges protrude from the sliding board, and the two flanges are slidably received in the installation hole.

3. The enclosure of claim 2, wherein a bent portion extends inward from one of the two flanges and is inclined to the hook such that the sliding member is biased by the bent portion.

4. The enclosure of claim 2, wherein the sliding member comprises two first sidewalls extending from two opposite sides of the sliding board, the at least one pillar extends outwards from one of the two first sidewalls; the mounting member comprises two second sidewalls parallel to each other, the least one sliding hole is defined in one of the two second sidewalls.

5. The enclosure of claim 4, wherein two securing pieces extend from the two second sidewalls, each of the two securing pieces defines at least one securing hole; at least two engaging portions are located on the side panel, and each of the at least two engaging portions is engaged in the at least one securing hole.

6. The enclosure of claim 5, wherein the at least two engaging portions are arranged at two opposite sides of the installation hole, and the at least two engaging portions are mirror symmetric to each other.

7. The enclosure of claim 1, wherein a first blocking piece and a second blocking piece extend from the side panel, a limiting hole and a cutout are defined in the positioning board, the first blocking piece is engaged in the limiting hole, and the second blocking member is engaged in the cutout, to prevent the positioning portion from disengaging from the side panel.

8. An enclosure comprising:
   a chassis defines an opening, the chassis comprising a front panel and a rear panel, a hem located on the front panel, a latching portion located on the rear panel;
   a side panel for covering the opening of the chassis, a clamping piece located in the side panel, the clamping piece engaged with the hem, an installation hole defined in the side panel; and
   a knob structure installed on the side panel, the knob structure comprising a sliding member slidably engaged in the installation hole, a mounting member, a resilient member and a positioning member attached to the side panel the mounting member defining at least one sliding hole, the sliding member comprising a hook and at least one pillar, the at least one pillar being engaged in the at least one sliding hole, to slidably secure the sliding member to the mounting member, a first end of the resilient member engaged with the sliding member, a second end of the resilient member engaged with the positioning member; the hook is engaged with the latching portion, and the resilient member is elastically deformable to the hook disengaged from the latching portion;

the sliding member further comprises a stopping portion, the positioning member comprises a limiting portion; the first end of the resilient member is engaged with the stopping portion, and the second end of the resilient member is engaged with the limiting portion;

the sliding member comprises two first sidewalls, the least one pillar extends from one of the two first sidewalls; the mounting member attached to the side panel and comprises two second sidewalls parallel to each other, the least one sliding hole is defined in one of the two second sidewalls;

two securing pieces extend from the two second sidewall, each of the two securing pieces defines at least one securing hole; at least two engaging portions are located on the side panel, and each of the at least two engaging portions is engaged in the at least one securing hole to secure the mounting member to the side panel;

the mounting member comprises a second rear wall, the second rear wall connected to the two second sidewalls, a gap is defined in the second rear wall, the first end of the resilient member extends through the gap to engage with the stopping portion; and a connecting piece extends from one edge of the gap, and is substantially perpendicular to the second rear wall, the positioning member comprises a positioning board, a protrusion extends from the positioning board, and the connecting piece is installed on the protrusion.

9. The enclosure of claim 8, wherein the sliding member further comprises a sliding board abutting an inside surface of the side panel, two flanges protrude from the sliding board, and the two flanges are slidably received in the installation hole.

10. The enclosure of claim 8, wherein the at least two engaging portions are arranged at two opposite sides of the installation hole, and the at least two engaging portions are mirror symmetric to each other.

11. The enclosure of claim 8, wherein a first blocking piece is located on the side panel, a limiting hole is defined in the positioning board, and the first blocking piece is engaged in the limiting hole.

12. The enclosure of claim 11, wherein a second blocking piece is located on the side panel, a cutout is defined in the positioning board, and the second blocking piece is engaged in the cutout.

* * * * *